United States Patent [19]
Gibbard

[11] 4,333,993
[45] Jun. 8, 1982

[54] AIR CATHODE FOR AIR DEPOLARIZED CELLS
[75] Inventor: Henry F. Gibbard, Schaumburg, Ill.
[73] Assignee: Gould Inc., Rolling Meadows, Ill.
[21] Appl. No.: 282,311
[22] Filed: Jul. 10, 1981

Related U.S. Application Data

[63] Continuation of Ser. No. 189,159, Sep. 22, 1980, abandoned.

[51] Int. Cl.³ .............................................. H01M 4/00
[52] U.S. Cl. ...................................... 429/27; 429/42; 429/219; 429/224
[58] Field of Search .................... 429/27–29, 429/40–45, 219, 224, 12; 252/182.1

[56] References Cited

U.S. PATENT DOCUMENTS

| 3,097,115 | 7/1963 | Moos | 136/120 |
|---|---|---|---|
| 3,097,116 | 7/1963 | Moos | 136/120 |
| 3,514,336 | 5/1970 | Giner et al. | 136/86 |
| 3,840,404 | 10/1974 | Porter et al. | 429/27 |
| 3,897,265 | 7/1975 | Jaggard | 136/86 A |
| 4,091,176 | 5/1978 | Alfenaar | 429/40 |
| 4,121,018 | 10/1978 | Kocherginsky et al. | 429/27 |
| 4,137,371 | 1/1979 | Blanchart et al. | 429/29 |
| 4,152,489 | 5/1979 | Chottiner | 429/27 |
| 4,189,526 | 2/1980 | Cretzmeyer et al. | 429/13 |

OTHER PUBLICATIONS

Charles B. Muchmore, A Mechanistic Study of Oxygen Transfer in Aqueous Systems, Dec. 1969, (Ph.D. Dissertation, Southern Illinois University at Carbondale) pp. 25-27.
G. F. Mills et al., "Oxygen Removal from Water by Ammine Exchange Resins", Industrial and Engineering Chemistry, vol. 41, pp. 2842-2844 (1949).

Primary Examiner—Charles F. LeFevour
Attorney, Agent, or Firm—Augustus J. Hipp

[57] ABSTRACT

Metal/oxygen cells such as zinc/oxygen cells using air as the source of oxygen are provided with a cathode comprising a unitary member which, in a preferred embodiment, satisfies all of the diverse requirements for a cathode in this type of cell, the unitary member consisting of a hydrophobic portion and a hydrophilic portion comprising an ion exchange material which carries the desired amounts of an oxygen reduction catalyst. In a preferred embodiment, the oxygen reduction catalyst likewise serves as the current collector.

14 Claims, 4 Drawing Figures

AIR CATHODE FOR AIR DEPOLARIZED CELLS

This is a continuation of application Ser. No. 189,159, filed Sept. 22, 1980, now abandoned.

RELATED APPLICATION

Cretzmeyer and Espig, Ser. No. 902,151, filed: May 5, 1978, for: "Metal/Oxygen Cells and Method for Optimizing the Active Life Properties Thereof", now U.S. Pat. No. 4,189,526.

This invention relates to gas depolarized electrochemical cells and, more particularly, to an improved air cathode for use in an air depolarized cell.

The technology underlying metal/oxygen cells is well known, and much effort has been directed to using this technology in a variety of applications. In some applications, such as batteries for hearing aids and the like, there are used small cells which are commonly referred to as button cells due to their button-like appearance. A typical button cell includes a casing having an aperture on one side of the cell, often termed the air side of the cell, through which air can enter the cell. A porous absorbent layer such as filter paper is typically positioned adjacent the aperture to promote even air distribution as the air passes into the cell. Adjacent to the absorbent layer is a cathode assembly, and many constructions are known.

In general, the cathode assembly will include a thin hydrophobic layer such as unsintered polytetrafluoroethylene with a current collecting screen positioned within. The cathode assembly likewise often includes carbon black, a catalyst for the oxygen reduction desired for operation of the cell, and a hydrophobic binder.

A separator is positioned adjacent to the cathode and separates it from the anode, typically zinc or amalgamated zinc powder onto which the requisite amount of electrolyte is placed prior to the final assembly of the cell, potassium hydroxide solutions commonly being used as electrolyte. Sealing of the cell to prevent electrolyte leakage through the cell and out the aperture is provided in some fashion; U.S. Pat. No. 3,897,265 is one example of such a button cell assembly.

To optimize the active life characteristics of button cells, an oxygen diffusion limiting member such as sintered polytetrafluorethylene can be introduced on the air side between the absorbent layer and the cathode. The specific details are set forth in the copending Cretzmeyer et al. patent, previously identified.

While the button cells are relatively thin, more recent potential applications are more demanding. Thus, such low current applications as digital and electric analog watches require even thinner cells than can be readily made by available technology.

Moreover, the manufacture of the conventional type of cathode assembly is a somewhat tedious operation, requiring careful quality control to provide satisfactory assembly. The present method of making conventional cathode assemblies thus involves, in general, pressing a mixture of high surface area carbon, a polytetrafluoroethylene emulsion and a catalyst such as manganese oxide onto a nickel plated steel screen which is to serve as the current collector. A layer of unsintered polytetrafluoroethylene is then generally laminated onto what will become the air side of the resulting material. The overall thickness of the final cathode assembly may become a limiting factor in attempts to make thinner button cells which have satisfactory performance characteristics.

Yet, despite the readily apparent impetus for developing improved methods of manufacture of cathodes which allow a thinner configuration, it must be appreciated that a variety of functions need to be satisfied by the cathode assembly. Thus, according to conventional theory, oxygen diffuses into a metal/oxygen cell and into the hydrophobic portion of the cathode. Then, under the influence of a concentration gradient caused by operation of the cell, oxygen diffuses further into the cathode structure where it reaches a hydrophilic portion containing an aqueous electrolyte, an oxygen reduction catalyst and an electronically conducting medium. In this region, oxygen is reduced by the transfer of electrons from the electronic conductor in response to a flow of electric current in a circuit external to the cell. To provide an efficient operation, it should be accordingly apparent that the cell cathode must incorporate (1) a means allowing an adequate supply of oxygen to reach the area where oxygen reduction takes place and, as well, a means of preventing flooding of the cell, i.e., - a layer of water or electrolyte developing between the incoming air and the area at which oxygen reduction takes place thereby limiting the supply of oxygen to a value less than that required for the desired current flow, (2) a means for providing the catalyst in a form capable of carrying out an efficient oxygen reduction and (3) a means for including a satisfactory current collector. Still further, the cathode assembly in cells used in applications requiring long useful lives must provide satisfactorily low water transport as is known.

It has been proposed to incorporate ion exchange materials in metal/oxygen cells for a variety of purposes. As one example, U.S. Pat. No. 4,137,371 utilizes an ion-exchaning membrane as a zincate restricting membrane to prevent poisoning of the electrochemically active material in a zinc/oxygen cell. The ion-exchanging membrane is joined directly to the oxygen electrode and is positioned between the porous layer of this electrode and the zinc electrode.

U.S. Pat. No. 3,514,336 describes an electrochemical cell which utilizes an ion exchange resin matrix having macroporous channels containing a free electrolyte in the channels that is disposed between the anode and cathode. When used in a fuel cell, such matrix is said to act as mixed current carriers so that the resins cannot dehydrate as a result of endosmatic transport, thus providing an electrolyte which remains homogenous.

A further use of ion-exchange materials is described in U.S. Pat. No. 3,097,115 wherein natural and synthetic zeolites are utilized to form electrodes for fuel cells. The electrodes are formed, by, in general, shaping the electrode as desired, ion exchanging the naturally occuring ions from the zeolite with the desired activating metallic exchange properties. U.S. Pat. No. 3,097,116 discloses forming an electrode structure by bonding the heat stabilized, ion exchange zeolite to a gas diffusion membrane, which membrane may be either hydrophilic or hydrophobic.

It is a primary aim of the present invention to provide a gas depolarized electrochemical cell which is characterized by an improved cathode construction.

A further object provides a cathode for a metal/oxygen button cell which is thinner than available cathode assemblies. A related and more specific object provides a cathode having a thickness in the range of from about 0.0005 to 0.003 inch.

Yet another object of this invention lies in the provision of a facile method for constructing an oxygen cathode for a metal/oxygen cell. A more specific object is to provide a method for making a cathode which is amenable to continuous production.

A still further object provides a cathode configuration having sufficient versatility to accommodate the particular performance requirements of a specific application. A more specific object provides a cathode member capable of achieving in a metal/oxygen cell a limiting current density in the range of from about 5 to 20 microamperes/sq.cm. of cathode area.

An additional object of this invention lies in the provision of a cathode member capable of achieving the desired gas diffusion limitation. A more specific object is to provide a cathode member which effectively prevents the flooding of a metal/oxygen cell.

Other objects and advantages of the present invention will become apparent from the following description and from the drawings in which.

Figure 1:
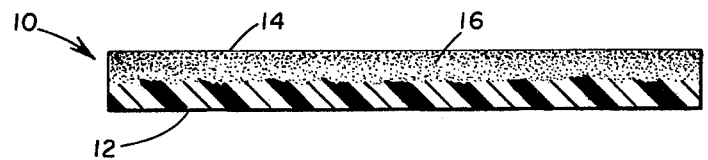
FIG. 1 is a cross-sectional view of a cathode for a metal/oxygen cell in accordance with the present invention and shows the various components comprising the subject cathode.

While the invention is susceptible to various modifications and alternative forms, there is shown in the drawings and will herein be described in detail, the preferred embodiments. It is to be understood, however, that it is not intended to limit the invention to the specific forms disclosed. On the contrary, it is intended to cover all modifications and alternative forms falling within the spirit and scope of the invention as expressed in the the appended claims. For example, while the present invention will be described in connection with zinc/air cells, and more specifically with zinc/air button cells, it should be appreciated that the invention is equally applicable to other metal/oxygen or air depolarized cells. Moreover, while the present invention will be primarily described in connection with the use of silver as the oxygen reduction catalyst, this is merely exemplary; and any other type of oxygen reduction catalyst could certainly be employed in conjunction with the cathode of this invention.

In general, the present invention is predicated on the discovery that an improved air cathode configuration for a metal/oxygen cell can be provided by utilizing a unitary membrane having a hydrophobic portion and a hydrophilic portion comprising an ion-exchange material containing therein the desired oxygen reduction catalyst. In this fashion, all of the diverse requirements needed for a cathode member in this type of cell can be provided in a single member, yet allowing an overall configuration which is thinner than present cathode assemblies.

Considering the present invention in greater detail, FIG. 1 illustrates a somewhat stylized view of the configuration of a cathode according to this invention. Thus, there is shown a cathode 10 having a hydrophobic portion 12 and a hydrophilic portion 14 comprising an ion-exchange material having dispersed therein oxygen reduction catalyst particles 16. The cathode is formed from a single material and is thereafter treated to provide the hydrophobic and hydrophilic portions as will be hereinafter described.

In accordance with one embodiment of this invention, the cathode is prepared by utilizing any of the materials used for the hydrophobic material in conventional cathode assemblies. In general, suitable hydrophobic materials should have relatively low carbon dioxide and water vapor transmission properties and sufficient oxygen transmission properties to support the necessary current requirements for the particular intended application. In this connection, many button cell applications involve discharge rates of from about 1 to about 35 microamperes/square centimeter of cathode area. Electronic watch applications typically require from about 5 to about 7 microamperes/square centimeter of cathode area. As illustrative examples of suitable materials for these applications, there can be listed sintered polytetrafluoroethylene, fluoroethylenepropylene polymers, and the like. Materials such as polyethylene, unsintered polytetrafluoroethylene and polypropylene may perhaps be useful.

The thickness of the hydrophobic material used for the cathode may suitably range from about 0.0005 inch to about 0.003 inch. Of course, if thicker cathodes are needed or desired for any reason, thicknesses in excess of 0.003 inch may certainly be utilized. Likewise, films of thicknesses less than 0.0005 inch may be found useful for some applications. In any event, the film utilized should be sufficiently pore-free to prevent electrolyte leakage to the oxygen side of the cell in use.

When a hydrophobic material is used, at least one surface must be converted to provide the necessary ion-exchange portion 14. This may be accomplished by any known means. As one example, when utilizing sintered polytetrafluoroethylene, styrene may be radiation grafted onto the polymer backbone; and the grafted portion of the resulting material can be then reacted with chlorosulfonic or sulfuric acid to convert such grafted portion to the $H^+$ form of a cation exchange material. As may be apparent, the amount of styrene grafted onto the membrane should be sufficient to provide the number of ion-exchange sites needed for the desired amount of catalyst. To accomplish this objective, the amount of styrene should be in the range of 20 to 50%, based upon the dry weight of the untreated membrane; the concentration of acid used should be in sufficient excess to sulfonate at least a majority of the aromatic rings of the styrene molecules present with at least one sulfonic acid group.

Likewise, the hydrophobic material may be converted to an anion-exchange material, as can be achieved by known techniques. This, of course, requires that the silver or other oxidation reduction catalyst used, be introduced in anionic form.

The ion-exchange portion may thus be either cationic or anionic in form, depending on the particular method utilized. It may be theorized that the anionic form would provide better permeability properties. On the other hand, the cationic form may well involve a more facile preparation technique and result in a somewhat more stable cathode assembly over a longer time period than would result when using an anionic-exchange material.

As general functional requirements, the ion-exchange portion should be stable in the presence of the type of electrolyte being utilized, typically a strong caustic such as KOH. In addition, the ion-exchange portion should be sufficiently permeable to water and hydroxyl ions so that an efficient oxygen reduction reaction can take place.

The particular depth of the ion-exchange portion can be varied as desired; but, in any event, there should be left a hydrophobic portion thickness sufficient to prevent leakage of the cell as well as satisfying the other characteristics as described herein. As is known, process parameters in forming the exchange portion, such as temperature, strength of reagent, and residence time will affect the depth of the ion-exchange portion which results.

As a processing technique, to insure that a satisfactory hydrophilic portion is formed, it may be desirable to first convert a hydrophobic membrane to a hydrophilic material throughout its thickness. The desired hydrophobic portion can then be provided by reconverting part of the hydrophilic layer to a hydrophobic character. Suitable reconversion techniques are well known, an example being treatment of a sulfonated material with steam or immersion in boiling water.

The hydrophilic, ion-exchange portion may then be converted to the form carrying the oxygen reduction catalyst, or its precursor. Silver, platinum and oxides of manganese are illustrative examples of suitable catalysts, silver being preferred for alkaline and platinum for acidic cells. Many techniques for such conversion are well known and allow the conversion to be carried out in a straightforward manner with continuous production.

However, in accordance with a preferred embodiment of this invention, the conversion is achieved by a novel technique which disperses the catalyst in an extremely uniform manner throughout the hydrophilic portion and allows as much catalyst to be incorporated as is desired. To this end, the initial step comprises converting the cation-exchange resin to a form containing counter ions capable of reducing the oxidation catalyst precursor to its active form. The catalyst precursor ions diffuse into the membrane and are there reduced to the catalytically active form. After washing to remove the anions present, the next step involves treating with a salt of the catalyst precursor. The salt used should be soluble in water or other solvent employed so that the reaction will proceed at a satisfactory rate and should be employed in sufficient excess to insure that at least the majority of particles of oxidation catalyst precipitate within the hydrophilic portion rather than on the surface thereof. After washing to remove the anions present in the oxidation catalyst precursor salt, the membrane may be placed in service in a cell or, if desired, the membrane may be further treated by contacting with the electrolyte to be used. Oxides of the oxidation catalyst, if present within the membrane, may be chemically or electrochemically reduced, if desired. As an illustrative example, formalin may be used to chemically reduce such oxides.

Considering an illustrative species, when silver is the desired oxidation catalyst, the conversion of the hydrophilic portion of the membrane can be carried out as follows. The conversion of the ion-exchange membrane from its cation form (typically—$H^+$) to the form containing counter ions capable of reducing $Ag^+$ ions may be accomplished by treating the membrane with an aqueous solution or $SnCl_2$, a 0.5 of 1 molar solution being satisfactory. Thorough washing with distilled water will readily remove the $Cl^-$ anions present so as to obviate precipitation of AgCl in later processing.

Incorporation of particles of silver dispersed within the hydrophilic portion of the membrane is then accomplished by contacting with an aqueous solution of a soluble silver salt such as AgF. A 0.5 or 1 molar solution may be usefully employed; but to insure that the silver particles are dispersed within the membrane, the soluble silver salt should be of sufficient concentration to insure that the $Ag^+$ ions are present in an excess in relation to the $Sn^{++}$ counter ions.

After washing to remove the fluoride anions present, as with distilled water, the membrane is ready for use. However, the membrane may contain some silver present as $Ag_2O$; and, if desired for a particular application, the membrane may be treated prior to use eliminate the presence of such $Ag_2O$ as has been described herein.

The resulting membrane will contain silver particles uniformly dispersed within the membrane in a highly active catalytic state, perhaps approaching an atomic state. If desired, the procedure may be repeated to increase the content of silver particles.

Alternatively, the conversion may be carried out by immersing the ion-exchange portion of the cathode membrane in a silver nitrate solution. After several rinsings with deionized water, the $Ag^+$ ions are converted to solid, dark brown $Ag_2O$ by immersing the ion-exchange portion in a KOH solution. The resulting cathode material may be rinsed in deionized water, dried in air at room temperature and stored until needed for use.

As may be appreciated, cells including $Ag_2O$ in the cathode member initially function as zinc-silver oxide cells. However, after a period of operation, the cell will be converted to a zinc/oxygen cell. Alternatively, if desired, the silver oxide can be reduced. The result is that the silver catalyst particles are dispersed throughout the ionic exchange portion of the cathode member so as to permit an efficient catalytic reduction. This procedure is not, however, preferred since it is more difficult to insure that the catalyst particles are optimally dispersed within the membrane.

In accordance with a preferred embodiment of the present invention, sufficient silver is ultimately provided so that the particles are sufficiently close together so that the catalyst can likewise serve as the current collector. Satisfactory closeness of the particles is readily apparent from the current density performance. Of course, if desired, a separate current collector may be employed, positioned on the hydrophilic side of the cathode.

Figure 2:
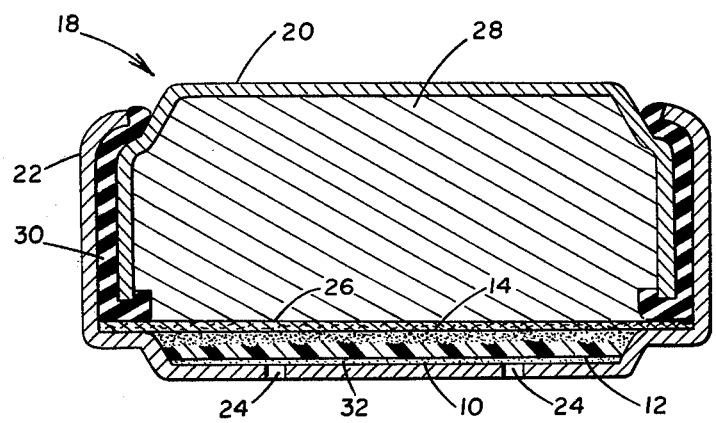
FIG. 2 is a cross-sectional view of a metal/oxygen cell and illustrates a cell which incorporates the cathode of the present invention therein.

FIG. 2 shows the use of the cathode 10 of this invention in a zinc/air cell of conventional construction. The cell, shown generally at 18, includes the cathode 10 positioned in a casing comprising an anode can 20 and a cathode can 22, the hydrophobic portion 12 of the cathode being adjacent the exterior or the air side of the cell. Air ingress into the cell is achieved through apertures 24. The separator 26 is positioned adjacent the hydrophilic side 14 of the cathode 10 and separates the zinc anode 28 from the cathode. Suitable sealing against leakage is provided by gasket 30. If desired, an air diffusing membrane 32, e.g.—filter paper, may be interposed between the hydrophobic portion 12 of the cathode 10 and the cathode can 22, as is shown.

The following Examples are illustrative, but not in limitation of the present invention. Unless otherwise indicated, all percentages are by weight and all solutions are aqueous.

EXAMPLE 1

This Example illustrates the current density-voltage characteristics which are capable of being achieved by utilizing the cathode configuration of the present invention.

Two 0.001 inch thick sintered polytetrafluoroethylene films were modified by gamma radiation grafting with styrene to provide a level of styrene in the range of 30% based upon the dry weight of the untreated films. One side was then masked with masking tape, and the films were submerged into a dilute solution of chlorosulfonic acid in methylene chloride (e.g.—about 1 to 5% chlorosulfonic acid) for about 15 to 30 minutes. After this sulfonation, with the masked side having retained its hydrophobic characteristics, the films were washed in methanol and boiled in water for one hour.

Cathodes were then formed from each film by boiling for one hour in a 5% KOH solution, rinsing in distilled water, immersing at room temperature in 0.5 M $SnCl_2$ for one hour, immersing in 0.5 M $AgNO_3$ for three hours, immersing in 40% KOH solution for one hour, and soaking in formalin for six days.

The resulting films were then dried in air at room temperature and then placed in conventional, commercial button cells as illustrated in FIG. 2. Specifically, the cathode was positioned adjacent the air aperture of the cell casing with its hydrophobic side positioned towards the air aperture. A separator was positioned between the zinc anode and the hydrophilic surface of the cathode.

Figure 3:
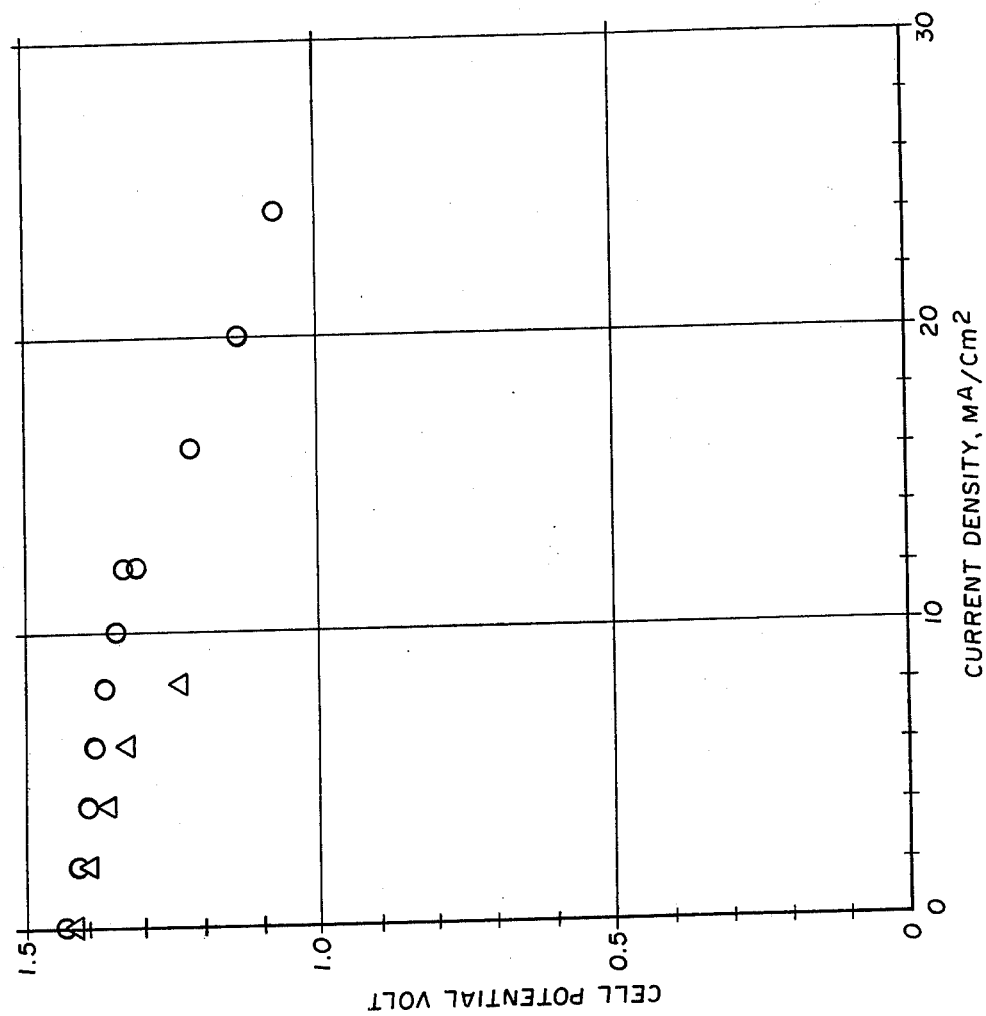
FIG. 3 is a graph of voltage versus current density and showing examples of the cell characteristics capable of being achieved with the cathode of the present invention.

FIG. 3 shows the current density-voltage characteristics achieved for the two cells, the performance of one cell being indicated on the graph by triangles and the other by circles. As can be seen, the cell characteristics are adequate for such low current drain applications as electronic watch applications.

EXAMPLE 2

This further illustrates the preparation of cathodes in accordance with this invention and the performance in conventional button cells.

Cathodes were prepared from 0.001 inch thick polytetrafluorethylene modified as in Example 1 by the same technique as set forth in Example 1. Specifically, the films were boiled in a 5% KOH solution for one hour, rinsed in distilled water, immersed at room temperature for about seven hours in a 0.5 M $SnCl_2$ solution, rinsing in distilled water, immersing in a 0.5 M AgF solution for 12 hours, immersing in a 45% KOH solution for $1\frac{1}{2}$ hours, and soaking in a 40% formalin solution for six days.

Figure 4:
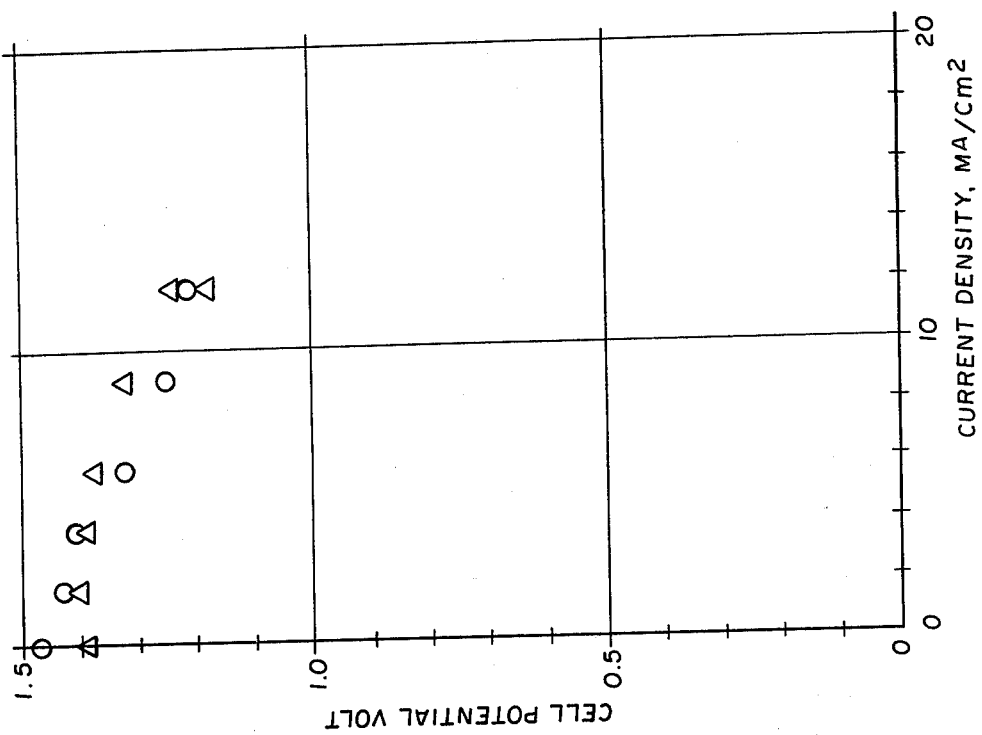
FIG. 4 is a graph similar to FIG. 3 and illustrating other examples of the cell characteristics achieved with the cathode of this invention.

After drying as in Example 1, the cathodes were positioned in cells as likewise described in Example 1. FIG. 4 sets forth the current density-voltage characteristics for the two cells tested, the symbols used to differentiate the cells being as described in Example 1. Again, the cells exhibited characteristics suitable for low current drain applications such as electronic watches.

Thus, as has been seen, the present invention provides a facile procedure which can be easily adapted to continuous processing for making an air cathode thinner than previous configurations. Because of the ability to use various polymeric materials as the hydrophobic base as well as the variety of ionic exchange members which may be utilized, the variations in the properties which can be achieved are relatively unlimited. Moreover, if desired, the cathode configuration can combine in one member not only the function of water transfer limitation (i.e.—obviating flooding) and catalytic oxygen reduction but can also incorporate the necessary current collection. Moreover, by the method of preparation, a highly and uniformly dispersed catalytic surface is obtained.

I claim:

1. A gas depolarized electrochemical cell comprising a cell casing having means allowing oxygen ingress therein, an anode and a cathode disposed in the casing, a separator interposed between the anode and cathode, a current collector and an electrolyte, said cathode consisting of a unitary member having a hydrophobic surface portion and a hydrophilic surface portion consisting of an ion-exchange portion having dispersed therein catalyst particles in an amount sufficient to carry out the desired oxygen reduction, the hydrophobic surface portion of the cathode being positioned to contact the ingressing oxygen.

2. The cell of claim 1 wherein the thickness of said cathode is in a range of from about 0.0005 inch to about 0.003 inch.

3. The cell of claim 1 wherein said hydrophobic surface portion is formed from a material selected from the group consisting of sintered polytetrafluoroethylene and fluoroethylenepropylene polymers.

4. The cell of claim 1 wherein said ion-exchange portion is cationic.

5. The cell of claim 1 wherein said ion-exchange portion is anionic.

6. The cell of claim 1 wherein said catalyst is a member selected from the group consisting of silver, platinum and oxides of manganese.

7. The cell of claim 1 wherein said catalyst particles are located sufficiently close together to serve as the current collector.

8. An air cathode for use in an air depolarized cell which consists of a unitary member having a hydrophobic surface portion and a hydrophilic surface portion consisting of an ion-exchange portion having dispersed therein catalyst particles to reduce oxygen.

9. The air cathode of claim 8 wherein the thickness of said member is in the range of from about 0.0005 inch to about 0.003 inch.

10. The air cathode of claim 8 wherein said hydrophobic surface portion is formed from a material selected from the group consisting of sintered polytetrafluoroethylene and fluoroethylenepropylene polymers.

11. The air cathode of claim 8 wherein said ion-exchange portion is cationic.

12. The air cathode of claim 8 wherein said ion-exchange portion is anionic.

13. The air cathode of claim 8 wherein said catalyst is a member selected from the group consisting of silver, platinum and oxides of manganese.

14. The air cathode of claim 8 wherein said catalyst particles are located sufficiently close together to serve as a current collector for an air depolarized cell.

* * * * *